United States Patent
Choi et al.

(10) Patent No.: US 11,159,670 B2
(45) Date of Patent: Oct. 26, 2021

(54) NOTIFICATION PROVIDING METHOD AND ELECTRONIC DEVICE IMPLEMENTING SAME

(71) Applicant: Samsung Electronics Co., Ltd, Suwon-si (KR)

(72) Inventors: Kyuhyung Choi, Seoul (KR); Giang Yoon Kwon, Seoul (KR); Ki Hyoung Son, Yongin-si (KR); Jihun Lee, Seoul (KR); Han-Soo Jung, Suwon-si (KR); Na-Woong Han, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/486,429

(22) PCT Filed: Jan. 23, 2018

(86) PCT No.: PCT/KR2018/000983
§ 371 (c)(1),
(2) Date: Aug. 15, 2019

(87) PCT Pub. No.: WO2018/151429
PCT Pub. Date: Aug. 23, 2018

(65) Prior Publication Data
US 2020/0228642 A1 Jul. 16, 2020

(30) Foreign Application Priority Data
Feb. 15, 2017 (KR) .................. 10-2017-0020572

(51) Int. Cl.
*H04M 1/72436* (2021.01)
*H04W 4/14* (2009.01)

(52) U.S. Cl.
CPC ......... *H04M 1/72436* (2021.01); *H04W 4/14* (2013.01)

(58) Field of Classification Search
CPC .......... H04M 1/7255; H04M 1/72552; H04M 1/72436; H04W 4/14
See application file for complete search history.

(56) References Cited

U.S. PATENT DOCUMENTS

2002/0046250 A1* 4/2002 Nassiri .................... H04L 51/30
709/206
2005/0124388 A1* 6/2005 Seo ................... H04M 1/72552
455/566
(Continued)

FOREIGN PATENT DOCUMENTS

KR 10-2014-0080898 A 7/2014
KR 10-2014-0137509 A 12/2014
(Continued)

OTHER PUBLICATIONS

Supplementary Partial European Search Report dated Nov. 19, 2019 in connection with European Patent Application No. 18 75 4625, 13 pages.
(Continued)

*Primary Examiner* — Dinh Nguyen

(57) ABSTRACT

Various embodiments provide an electronic device and a method, the electronic device comprising a memory; a communication unit; a display; and a processor functionally connected to the memory, the communication unit, or the display, wherein the processor is configured to identify log information associated with a notification received through the communication unit, determine a display order of the notification based on the log information, and display the notification on the display based on the determined display order. Also, other embodiments are possible.

16 Claims, 11 Drawing Sheets

(56) References Cited

U.S. PATENT DOCUMENTS

| | | | |
|---|---|---|---|
| 2008/0056463 A1* | 3/2008 | Lahtiranta | H04M 1/7255 379/88.18 |
| 2010/0062753 A1 | 3/2010 | Wen et al. | |
| 2010/0077054 A1* | 3/2010 | Harada | H04L 51/24 709/207 |
| 2011/0258559 A1 | 10/2011 | You et al. | |
| 2012/0258691 A1 | 10/2012 | Baer et al. | |
| 2013/0316744 A1 | 11/2013 | Newham et al. | |
| 2013/0346882 A1 | 12/2013 | Shiplacoff et al. | |
| 2014/0179377 A1 | 6/2014 | Song et al. | |
| 2014/0351744 A1 | 11/2014 | Jeon et al. | |
| 2015/0019966 A1* | 1/2015 | Jeon | H04L 51/24 715/716 |
| 2016/0018954 A1* | 1/2016 | Park | H04L 51/046 715/758 |
| 2016/0063492 A1* | 3/2016 | Kobres | H04W 12/003 705/16 |
| 2016/0277346 A1 | 9/2016 | Xu et al. | |
| 2016/0359782 A1 | 12/2016 | Son et al. | |

FOREIGN PATENT DOCUMENTS

| | | |
|---|---|---|
| KR | 10-1552864 B1 | 9/2015 |
| KR | 10-2016-0122629 A | 10/2016 |
| KR | 10-2016-0143139 A | 12/2016 |

OTHER PUBLICATIONS

International Search Report dated May 18, 2018 in connection with International Patent Application No. PCT/KR2018/000983, 2 pages.
Written Opinion of the International Searching Authority dated May 18, 2018 in connection with International Patent Application No. PCT/KR2018/000983, 6 pages.
Supplementary European Search Report dated Feb. 21, 2020 in connection with European Patent Application No. 18 75 4625, 11 pages.

* cited by examiner

|     | App Name | Title | Action Time | Check Time |
|-----|----------|-------|-------------|------------|
| 311 | Message | Ali | +00:10:12 | +00:00:30 |
| 313 | Message | Rachel | +00:23:40 | +00:00:30 |
| 315 | Message | Linsay | +06:01:30 | +00:00:40 |
| 317 | Cloud | Document Saved | +07:00:30 | +00:02:30 |
| 319 | File Manager | Photo Shared | +07:00:30 | +00:13:30 |

FIG.3A

NOTIFICATION PROVIDING METHOD AND ELECTRONIC DEVICE IMPLEMENTING SAME

CROSS-REFERENCE TO RELATED APPLICATIONS

This application is a 371 of International Application No. PCT/KR2018/000983 filed on Jan. 23, 2018, which claims priority to Korean Patent Application No. 10-2017-0020572 filed on Feb. 15, 2017, the disclosures of which are herein incorporated by reference in their entirety.

BACKGROUND

1. Field

Various embodiments relate to a method and an apparatus for providing a notification.

2. Description of Related Art

With recent development of digital technology, various types of an electronic device such as a mobile communication terminal, a personal digital assistant (PDA), an electronic organizer, a smart phone, a tablet personal computer (PC), a wearable device are widely used. To support and grow functionality, such an electronic device is continuously improving hardware part and/or software part of the electronic device.

The electronic device may receive a message (or a push message) from a server (e.g., a mobile communication server, an application server, etc.) on a periodic basis or in real time for status check, update, and an application (or program) installed on the electronic device. Alternatively, if the application installed on the electronic device provides a message function (e.g., a short message service (SMS), a multimedia message service (MMS), an instant messenger service), the electronic device may receive a message from the other electronic device through the application. The electronic device may notify the message reception to a user by displaying the received message.

An electronic device may display a message reception notification in order of the reception regardless of a type of the received message. That is, the conventional art exposes the reception notification of the latest message received at the top of a display region regardless of importance of the message. If a great number of messages are received at a time, or if a user does not identify reception notifications for a while, the reception notifications may exceed the display region. If the reception notifications exceed the display region, the user may find his/her intended reception notification by scrolling through a receive notification list. However, the reception notifications include a push message or an update notification which is broadcast to arbitrary users, and the push message is lower than other message in priority to the user. For example, due to the reception notification of the low priority, the reception notification of high priority may be exposed at the bottom of the display region, or exceed the display region. In this case, the user may not easily recognize whether his/her important message is received or not.

Various embodiments may provide a method and an apparatus for determining a display order of the notification based on time log information (e.g., an action time or a check time) of past user reactions associated with the notification (e.g., a message).

SUMMARY

An electronic device according to various embodiments may include a memory, a communication unit, a display, and a processor functionally coupled with the memory, the communication unit or the display, wherein the processor may be configured to identify log information associated with a notification received through the communication unit, determine a display order of the notification based on the log information, and display the notification on the display based on the determined display order.

An operating method of an electronic device according to various embodiments may include identifying log information associated with a notification received, determining a display order of the notification based on the log information, and displaying the notification based on the determined display order.

According to various embodiments, a display order of a notification may be determined based on time log information (e.g., an action time or a check time) of past user reactions associated with the notification (e.g., a message).

According to various embodiments, a notification reacted fast by a user in the past may be disposed at the top (e.g., a first display order) of a display region, and a notification reacted slowly by the user in the past may be disposed at the bottom (e.g., a last display order) of the display region.

According to various embodiments, user convenience may be improved, by displaying to a user a notification of high importance at the top of a display region, and displaying to the user a notification of low importance at the bottom of the display region.

According to various embodiments, more information of a notification determined to be important to a user may be provided, by changing notification display information displayed at the top of a display region differently from notification display information displayed at the bottom of the display region.

BRIEF DESCRIPTION OF THE DRAWINGS

FIG. 3A is a diagram illustrating an example of storing log information associated with a notification according to various embodiments.

DETAILED DESCRIPTION

Figure 1:
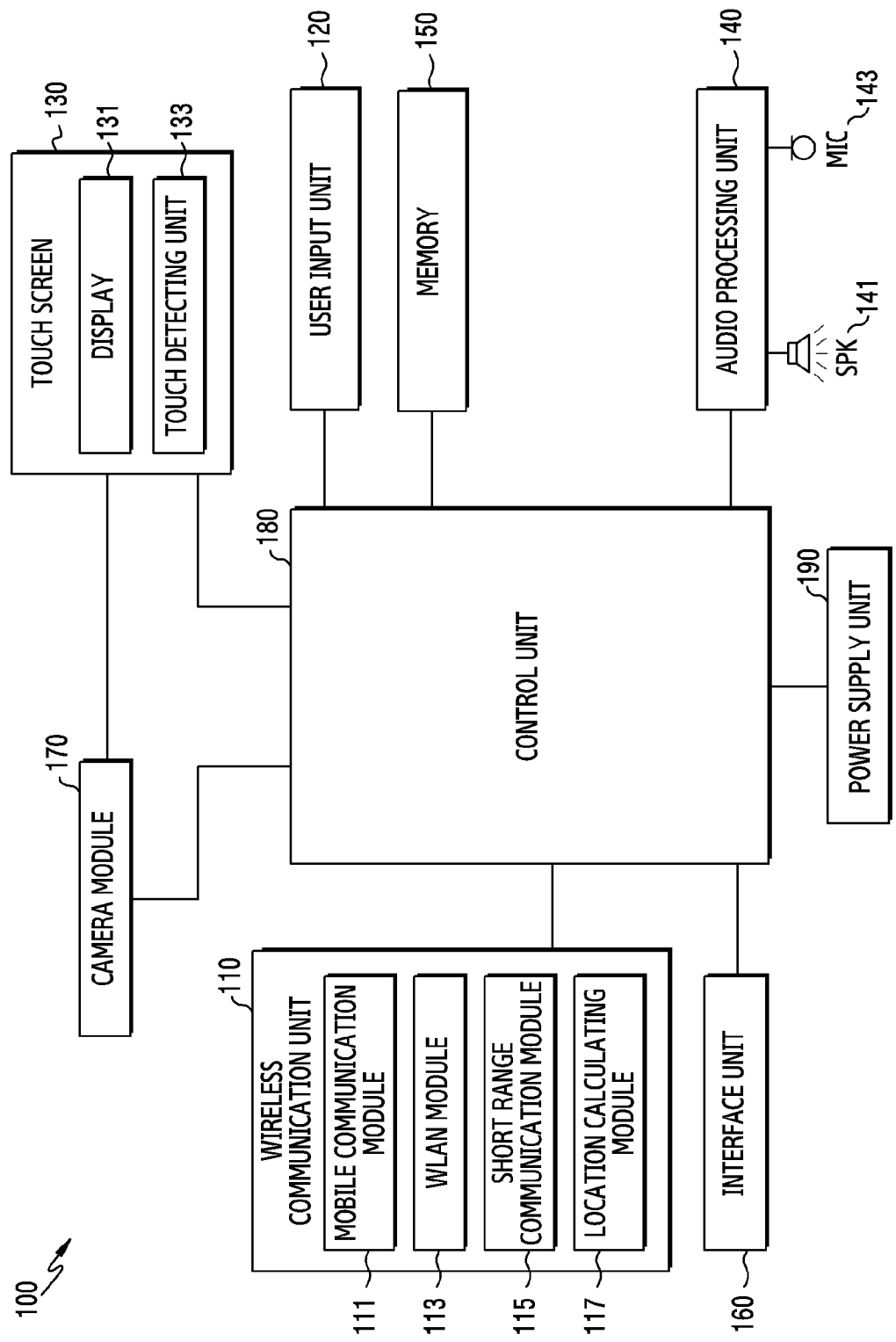
FIG. 1 is a diagram illustrating a configuration of an electronic device according to various embodiments.

Hereinafter, various embodiments of the present invention are described with reference to the accompanying drawings. However, it should be understood that it is not to limit the technique disclosed in the present invention to particular forms, and but to cover various modifications, equivalents, and/or alternatives of embodiments of the present invention. In describing the drawings, similar reference numerals may be used for similar constituent elements. Embodiments disclosed in the present invention are provided merely to easily describe and understand technical details, and are not intended to limit the scope of the present invention. Accordingly, the scope of the present invention should be construed as including all modifications or various other embodiments based on the technical idea of the present invention. In embodiments of the present invention, an electronic device may include any device using one or more of various processors such as an application processor (AP), a communication processor (CP), a graphic processing unit (GPU), and a central processing unit (CPU), such as any information communication device, multimedia device, wearable device, and their application devices, supporting functionality (e.g., display functionality) according to various embodiments of the present invention.

An electronic device according to an embodiment of the present invention may include at least one of, for example, a smartphone, a tablet personal computer (PC), a mobile phone, a video phone, an e-book reader, a desktop PC, a laptop PC, a netbook computer, a workstation, a server, a personal digital assistant (PDA), a portable multimedia player (PMP), a moving picture experts group audio layer 3 (MP3) player, a mobile medical appliance, a camera, or a wearable device (e.g., smart glasses, a head-mounted-device (HMD), or a smart watch).

Also, an electronic device in an embodiment of the present invention may be a smart home appliance. The smart home appliance may include at least one of, for example, a television, a digital video disk (DVD) player, a refrigerator, an air conditioner, a vacuum cleaner, a washing machine, a set-top box, a home automation control panel, a television (TV) box (e.g., Samsung HomeSync™, Apple TV™, or Google TV™), a game console (e.g., Xbox™, PlayStation™), or an electronic frame. Also, the electronic device may include at least one of a navigation device or an Internet of things (IoT) device.

In various embodiments, an electronic device may be a combination of one or more of those various devices. In an embodiment, the electronic device may be a flexible device. Also, the electronic device according to an embodiment of the present invention is not limited to the foregoing devices, and may include a new electronic device based on technological development.

Also, the term user in an embodiment of the present invention may refer to a person using an electronic device or a device using an electronic device (e.g., an artificial intelligence electronic device). In an embodiment of the present invention, a module or a program module may further include at least one of the various components of the present invention, or omit some of them, or further include additional other components. Operations performed by modules, program modules, or other components according to various embodiments may be executed in a sequential, parallel, repetitive, or heuristic manner. In addition, some operations may be executed in a different order or be omitted, or other operations may be added.

Hereafter, a method and an apparatus for providing a visual effect according to a bezel based interaction according to an embodiment of the present invention are explained by referring to the attached drawings. However, various embodiments of the present invention are not restricted by or limited to contents which will be described below and therefore, and it should be noted that they may be applied to various embodiments based on the embodiments to be described below. In various embodiments of the present invention described below, a hardware approach will be described as an example. However, since various embodiments of the present invention include a technology using both hardware and software, various embodiments of the present invention do not exclude a software-based approach.

FIG. 1 is a diagram illustrating a configuration of an electronic device according to various embodiments.

Referring to FIG. 1, an electronic device 100 according to various embodiments of the present invention may include a wireless communication unit 110, a user input unit 120, a touch screen 130, an audio processing unit 140, a memory 150, an interface unit 160, a camera module 170, a control unit 180, and a power supply unit 190. The electronic device 100 may not necessarily include the components of FIG. 1 in various embodiments of the present invention, and may be configured to include more components than the components of FIG. 1, or to include less components.

The wireless communication unit 110 may include one or more modules enabling wireless communications between the electronic device 100 and other external electronic device. In various embodiments, the wireless communication unit 110 may include a module (e.g., a short range communication module, a telecommunications module, etc.) for communicating with an external electronic device in vicinity. For example, the wireless communication unit 110 may include a mobile communication module 111, a wireless local area network (WLAN) module 113, a short range communication module 115, a location calculating module 117, and so on.

The mobile communication module 111 may transmit and receive radio signals to and from a base station, an external electronic device, and at least one of various servers (e.g., an integration server, a provider server, a content server, an Internet server, or a cloud server) on a mobile communication network. The radio signals may include a voice signal, a data signal, or various control signals. The mobile communication module 111 may transmit various data required for operations of the electronic device 100, to an external device (e.g., a server or other electronic device) in response to a user request. In various embodiments, the mobile communication module 111 may transmit and receive radio signals based on various communication schemes. For example, the communication methods may include a communication scheme such as, but not limited to, long term evolution (LTE), LTE advanced (LTE-A), global system for mobile communication (GSM), enhanced data GSM environment (EDGE), code division multiple access (CDMA), wideband CDMA (WCDMA), universal mobile telecommunications system (UMTS), or orthogonal frequency division multiple access (OFDMA), and so on.

The WLAN module 113 may indicate a module for establishing wireless Internet access and WLAN link with the other external electronic device. The WLAN module 113 may be embedded in or mounted outside the electronic device 100. The wireless Internet technique may use wireless fidelity (WiFi), wireless broadband (Wibro), world interoperability for microwave access (WiMax), high speed downlink packet access (HSDPA), or millimeter wave (mmWave). In association with the other external electronic device connected with the electronic device 100 over the network (e.g., the wireless Internet network), the WLAN module 113 may transmit various data of the electronic device 100 to the outside (e.g., the external electronic device or the server), or receive from the outside. The WLAN module 113 may keep turning on, or may be turned on according to setting of the electronic device 100 or a user input.

The short range communication module 115 may indicate a module for performing short range communication. The short range communication may use Bluetooth, Bluetooth low energy (BLE), radio frequency identification (RFID), infrared data association (IrDA), ultra wideband (UWB), Zigbee, or near field communication (NFC). In association with the other external electronic device (e.g., an external sound device) connected with the electronic device 100 over the network (e.g., a short range communication network), the short range communication module 115 may transmit or receive various data of the electronic device 100 to or from the outside. The short range communication module 115 may keep turning on, or may be turned on according to the setting of the electronic device 100 or a user input.

The location calculating module 117 is a module for acquiring a location of the electronic device 100, and may include, for example, a global position system (GPS) module. The location calculating module 117 may measure the location of the electronic device 100 using triangulation. For example, the location calculating module 117 may calculate distance information and time information from three or more base stations, apply the triangulation to the calculated information, and thus calculate three-dimensional current location information based on latitude, longitude, and altitude. Alternatively, the location calculating module 117 may calculate the location information by continuously receiving location information of the electronic device 100 from three or more satellites in real time. The location information of the electronic device 100 may be acquired using various methods.

The user input unit 120 may generate input data for controlling the operation of the electronic device 100 in response to a user input. The user input unit 120 may include at least one input means for detecting user's various inputs. For example, the user input unit 120 may include a key pad, a dome switch, a physical button, a touch pad (resistive/capacitive), a jog & shuttle, and a sensor. Part of the user input unit 120 may be implemented as a button outside the electronic device 100, and part or whole may be implemented as a touch panel. The user input unit 120 may receive a user input for initiating the operation of the electronic device 100, and generate an input signal based on the user input according to various embodiments of the present invention.

The touch screen 130 indicates an input/output device which may execute an input function and a displaying function at the same time, and may include a display 131 and a touch detecting unit 133. The touch screen 130 may include an intermediary role for providing an input/output interface between the electronic device 100 and the user, forwarding a user's touch input to the electronic device 100, and showing an output from the electronic device 100 to the user. The touch screen 130 may display a visual output to the user. The visual output may represent text, graphic, video, and their combination. In an embodiment of the present invention, the touch screen 130 may display various screens according to the operation of the electronic device 100 through the display 131. As displaying a particular screen on the display 131, the touch screen 130 may detect an event (e.g., a touch event, a proximity event, a hovering event, an air gesture event) based on at least one of touch, hovering, and air gesture from the user through the touch detecting unit 133, and send an input signal based on the event to the control unit 180.

According to various embodiments of the present invention, the display 131 may display (output) various information processed in the electronic device 100. For example, the display 131 may display a user interface or a graphical UI (GUI) relating an operation for providing a notification based on a display order of the notification. The display 131 may support a screen display in a landscape mode, a screen display in a portrait mode, or a screen display according to transition between the landscape mode and the portrait mode, based on a rotation direction (or an orientation) of the electronic device 100. The display 131 may employ various displays. In various embodiments, the display 131 may employ a bended display. For example, the display 131 may include a bended display which may be bent, folded or rolled without damages by use of a thin and flexible substrate like paper.

The bended display may be coupled to a housing (e.g., a main body) and maintain its bending shape. In various embodiments, the electronic device 100 may be implemented using a display device which may be freely bent and unrolled like a flexible display as well as the bended display. In various embodiments, the display 131 may give foldable and unfoldable flexibility by substituting a glass substrate covering a liquid crystal with a plastic film in a liquid crystal display (LCD), a light emitting diode (LED) display, an organic LED (OLED) display, an active matrix OLED (AMOLED) display, or an electronic paper. In various embodiments, the display 131 may be extended and coupled to at least one side (e.g., at least one surface of a left side, a right side, an upper side, and a lower side) of the electronic device 100.

The touch detecting unit 133 may be received in the display 131, and detect a user input which contacts or approaches a surface of the touch screen 130. The touch detecting unit 133 may receive the user input for initiating the operation to use the electronic device 100, and generate an input signal according to the user input in the embodiment of the present invention. The user input may include a touch event or a proximity event inputted based on at least one of single-touch, multi-touch, hovering, or air gesture input. For example, the user input may be inputted using tap, drag, sweep, swipe, flick, drag and drop, or a drawing gesture (e.g., writing).

The audio processing unit 140 may perform functions for transmitting an audio signal inputted from the control unit 180 to a speaker (SPK) 141, and forwarding an audio signal such as a voice input from a microphone (MIC) 143 to the control unit 180. The audio processing unit 140 may convert and output voice/sound data as an audible sound through the speaker 141 under control of the control unit 180, and convert an audio signal such as a voice received from the microphone 143 into a digital signal and forward to the control unit 180. The audio processing unit 140 may output an audio signal responding to the user input according to audio processing information (e.g., an effect sound, a music file, etc.) inserted into data.

The speaker 141 may output audio data received from the wireless communication interface 110 or stored in the memory 150. The speaker 141 may output sound signals relating to various operations (functions) conducted in the electronic device 100. Although not depicted in the embodiment of the present invention, the speaker 141 may connect an attachable and detachable earphone, a headphone or a headset, to the electronic device 100 through an external port.

The microphone 143 may receive and process an external sound signal into electric voice data. Various noise reduction algorithms may be realized in the microphone 143 to cancel noises generating when the received external sound signal is inputted. The microphone 143 may receive an audio stream such as a voice command (e.g., a voice command for initiating a music application). The microphone 143 may include an internal microphone built in the electronic device 100 and an external microphone connected to the electronic device.

The memory 150 may store one or more programs executed by the control unit 180, and may temporarily store input/output data. The input/output data may include, for example, files such as video, image, photo, and audio. The memory 150 may store the obtained data, the data obtained in real time may be stored in a temporary storage device, and data determined to store may be stored in a storage device allowing long-term storage.

The memory 150 may store log information associated with the notification, for example, at least one of time information, position information, interaction information or application information. The memory 150 may store time information (or time log information) including an active time and a check time. The memory 150 may store a notification log table which stores an application, the action time and the check time corresponding to detailed information of the application. In addition, the memory 150 may, if receiving a notification, store the received notification in a first stack, and if the display order of the notification is determined based on log information, store the received notification in a second stack based on the display order. In various embodiments, the memory 150 may store instructions for, when executed, causing the control unit 180 (e.g., one or more processors) to identify whether log information associated with a notification received through the wireless communication unit 110 is stored in the memory 150, determine a display order of the notification based on the log information, and display the notification on the display 131 based on the determined display order.

The memory 150 may permanently or temporarily store an operating system (OS) of the electronic device 100, a program relating to the input and the display control using the touch screen 130, a program for controlling various operations (functions) of the electronic device 100, and various data occurring by the program operations.

The memory 150 may include an extended memory (e.g., an external memory) or an internal memory. The memory 150 may include at least one storage medium of memories such as a flash memory type, a hard disk type, a micro type, and a card type (e.g., a secure digital (SD) card or an eXtreme digital (XD) card), and memories of a dynamic random access memory (DRAM), a static random access memory (SRAM), a read-only memory (ROM), a programmable ROM (PROM), an electrically erasable PROM (EEPROM), a magnetic RAM (MRAM), a magnetic disk, and an optical disc type. The electronic device 100 may operate in association with a web storage which performs a storage function of the memory 150 on the Internet.

The memory 150 may store various software. For example, software components may include an OS software module, a communication software module, a graphic software module, a user interface software module, a MPEG module, a camera software module, and one or more application software modules. Also, since the module which is the software component may be represented as a set of instructions, the module may be referred to as an instruction set. The module may be also referred to as a program.

The OS software module may include various software components for controlling general system operations. Such general system operation control may indicate, for example, memory management and control, and power control and management. The OS software module may also facilitate communications between various hardware (devices) and software components (modules). The communication software module may enable communication with another electronic device such as a computer, a server or a portable terminal through the wireless communication interface 110. Also, the communication software module may be configured in a protocol structure corresponding to a corresponding communication method.

The graphic software module may include various software components for providing and displaying graphics on the touch screen 130. The term graphics may be used to include a text, a webpage, an icon, a digital image, a video, an animation and so on. The user interface software module may include various software components relating to the UI. For example, it is involved in a status change of the user interface and a condition for the user interface status change.

The MPEG module may include a software component enabling digital content (e.g., video, audio) processes and functions (e.g., content creation, reproduction, distribution, and transmission). The camera software module may include camera related software components enabling camera related processes and functions.

The application module may include a web browser including a rendering engine, email, instant message, word processing, keyboard emulation, address book, widget, digital right management (DRM), iris scan, fingerprint scan, context cognition, voice recognition, and a location based service. According to various embodiments of the present invention, the application module may process operations (functions) for outputting a sound sample corresponding to a selected cell, displaying a representative color of the selected cell, and displaying a trace effect in a region between two cells.

The interface unit 160 may receive data or power from other external electronic device and forward to the components of the electronic device 100. The interface unit 160 may transmit data inside the electronic device 100 to the other external electronic device. For example, the interface 160 may include a wired/wireless headphone port, an external charger port, a wired/wireless data port, a memory card port, an audio input/output port, a video input/output port, an earphone port and so on.

The camera module 170 indicates a configuration for supporting a shooting function of the electronic device 100. The camera module 170 may capture an object under control of the control unit 180, and send the captured data (e.g., an image) to the display 131 and the control unit 180. The camera module 170 may include one or more image sensors. For example, the camera module 170 may include a front-facing sensor (e.g., a front-facing camera) disposed on a front side (e.g., the same plane as the display 131) of the electronic device 100, and a rear-facing sensor (e.g., a rear-facing camera) disposed on a back side (e.g., a rear side) of the electronic device 100.

The control unit 180 may control general operations of the electronic device 100. For example, the control unit 180 may perform various controls on music play, metronome function processing, visualization of musical attributes, voice communication, data communication, and video communication. The control unit 180 may be implemented using one or more processors, or the control unit 180 may be referred to as a processor. For example, the control unit 180 may include a CP, an AP, an interface (e.g., general purpose input/output (GPIO)), or an internal memory, as separate components, or may integrate them on one or more integrated circuits. The AP may conduct various functions for the electronic device 100 by executing various software programs, and the CP may process and control voice communications and data communications. Also, the control unit 180 may execute a particular software module (an instruction set) stored in the memory 150 and thus carry out specific functions corresponding to the module.

In various embodiments of the present invention, the control unit 180 may process operations for identifying log information associated with a notification received through the wireless communication unit 110, determining a display order of the notification based on the log information, and displaying the notification on the display 131 based on the determined display order. The control operation of the control unit 180 according to various embodiments of the present invention is now described with the drawings.

The control unit 180 according to an embodiment of the present invention may control various operations relating to typical functions of the electronic device 100 in addition to the above-stated functions. For example, the control unit 180 may, if a particular application is executed, control its operation and the screen display. Also, the control unit 180 may receive an input signal corresponding to various touch events or proximity event inputs supported by a touch-based or proximity-based input interface (e.g., the touch screen 130), and control its function operation. Also, the control unit 180 may control various data transmissions and receptions based on the wired communication or the wireless communication.

The power supply unit 190 may receive external power or internal power and supply the power required to operate the components under control of the control unit 180. In an embodiment of the present invention, the power supply unit 190 may supply or cut (on/off) the power to display 131 and the camera module 170 under the control of the control unit 180.

Various embodiments described in the present invention may be implemented in a recording medium which may be read by a computer or a similar device using software, hardware, or a combination thereof. According to hardware implementation, embodiments described in the present invention may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and electric units for performing other functions.

In some cases, embodiments described in the specification may be implemented by the control unit 180. Also, according to software implementation, embodiments such as the procedures and the functions explained in the specification may be implemented by separate software modules. The software modules each may execute one or more functions and operations described in the specification.

An electronic device according to various embodiments may include a memory 150, a communication unit 110, a display 131, and a processor 180 functionally coupled with the memory, the communication unit or the display, wherein the processor 180 may be configured to identify log information associated with a notification received through the communication unit, determine a display order of the notification based on the log information, and display the notification on the display based on the determined display order.

The log information may include at least one of time information, position information, interaction information or application information.

The time information may include an action time for entering an application associated with the notification through the notification and a check time for the user to identify the notification.

The processor may be configured to determine whether there is another notification, if there is the another notification, identify the action time based on attribute information of the notification, compare the action time of the notification with an action time of the another notification, and determine the display order of the notification based on the comparison result.

The processor may be configured to, if the action time of the notification is ahead of the action time of the another notification, determine the display order of the notification to be above the display order of the another notification.

The processor may be configured to, if the action times are the same, determine the display order of the notification of the faster check time to be above the display order of the notification of the slower check time.

The processor may be configured to change display information of a notification positioned at the top of the display order differently from display information of a notification positioned at the bottom of the display order based on the display order.

The processor may be configured to change the display information of the notification based on the display order and attribute information of the notification.

The display information may include at least one of an amount, a structure, a size, a color, an image or a shape of information provided when the notification is provided.

The processor may be configured to, if the log information is not stored, determine the display order of the notification to the center of a display region of the display based on a notification reception time.

The processor may be configured to, if the log information is not stored, determine the display order of the notification to the last display order of a notification list based on a notification reception time.

The processor may be configured to determine whether the notification exceeds the display region, and if the notification exceeds the display region, determine the display order of the notification to a preset position.

The processor may be configured to determine the display order of the notification by further considering at least one of a cumulative use time of an application associated with the notification, current position information, a current time, an interaction type associated with the notification check or a type of the application associated with the notification together with the log information.

The processor may be configured to include an indicator for switching to a second user interface which provides a notification based on a notification reception time in a first user interface which provides a notification based on the log information.

The processor may be configured to, if the indicator is selected while the first user interface is displayed, switch to the second user interface.

Figure 2:
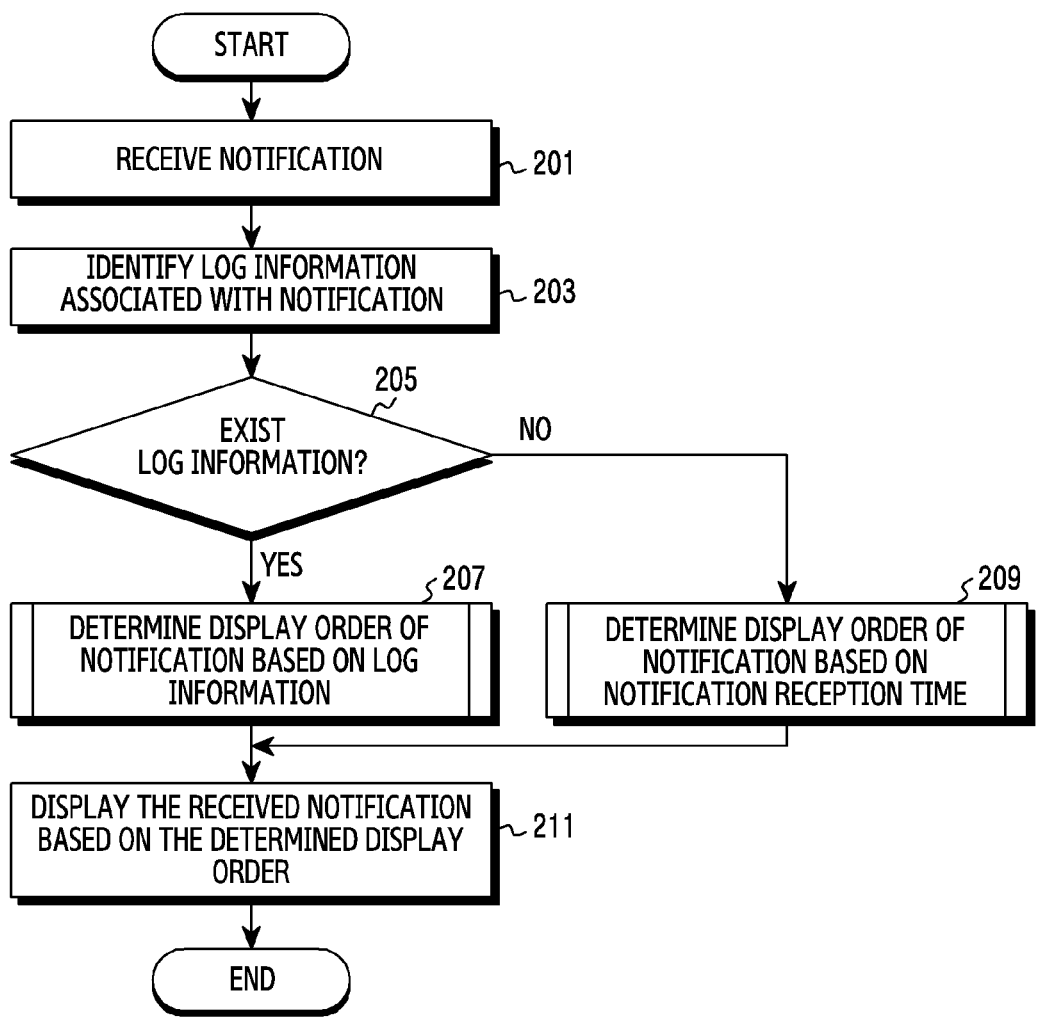
FIG. 2 is a flowchart illustrating a notification providing method of an electronic device according to various embodiments.

FIG. 2 is a flowchart illustrating a notification providing method of an electronic device according to various embodiments.

Referring to FIG. 2, in operation 201, the electronic device 100 (e.g., the control unit 180) may receive a notification. The control unit 180 may receive a message (e.g., a push message) from a server or the other electronic device (e.g., via a base station) through the wireless communication unit 110 on a periodic basis or in real time for status check, update, and an application (or a program) installed on the electronic device 100. In addition, if the application installed on the electronic device 100 provides a message function (e.g., SMS, MMS, instant messenger service), the electronic device 100 may receive a message from the other electronic device through the application. The electronic device 100 may display the received message and thus inform the received message to the user. Hence, the "notification" in the present invention may collectively indicate all forms for informing the message received from the server or the other electronic devices to the user.

If receiving the notification, the control unit 180 according to various embodiments may retrieve a notification displaying method which is set in the electronic device 100. For example, if the notification displaying method is set to "time based displaying" in the electronic device 100, the control unit 180 may not perform operation 203 through operation 211. Alternatively, if the notification displaying method is set to "importance displaying" or "priority displaying" in the electronic device 100, the control unit 180 may perform operation 203 through operation 211. Alternatively, the control unit 180 may perform operation 203 through operation 211 regardless of the notification displaying method set in the electronic device 100.

In operation 203, the electronic device 100 (e.g., the control 180) may identify log information associated with the notification. The log information may include at least one of time information, position information, interaction information or application information. For example, the time information (or time log information) may indicate an average time of a user reaction to the notification in the past. For example, the time information may include an action time and a check time. Alternatively, the time information may include a current time of the electronic device 100. The position information may indicate a current position of the electronic device 100. The interaction information indicates a type of a user input, for example, long press, swipe. The application information may include a name, a type, and a cumulative use time of the application.

The action time may be an average time taken to enter a corresponding application (e.g., execute the application) through the notification. For example, the action time may be an average value of the action times during a specific number of times in the past (e.g., 3 times, 5 times, etc.). If the specific number of times is 3 times, if the first action time is 3 minutes, the second action time is 1 minute, and the third action time is 5 minutes, the average of the action times may be 3 minutes.

The check time may be an average time taken for the user to identify the notification. For example, the check time may be an average value of the check times for the specific number of times in the past (e.g., 3 times, 5 times, etc.). If detecting (or receiving) a touch input which selects the notification, the control unit 180 may determine that the user identifies the notification. The touch input may be at least one of long press, swipe, pinch-in or pinch-out. The control unit 180 according to various embodiments may calculate the check time individually according to the interaction (e.g., long press, swipe, etc.) of the touch input, or calculate one check time regardless of the interaction. For example, if the check time is calculated individually according to the interaction, the control unit 180 may apply a different weight to each interaction, and differently set a priority of the check time according to the weight. For example, the control unit 180 may set the long press check time to a lower priority than the swipe check time, and set the pinch-in check time to a lower priority than the pinch-out check time.

In operation 205, the electronic device 100 (e.g., the control unit 180) may determine whether there is log information. For example, the control unit 180 may search the memory 150 for the log information corresponding to attribute information of the notification. The attribute information may include the application (or the type of the application) corresponding to the notification or detailed information (e.g., a title, contents, and the other party) corresponding to the notification. The detailed information may differ according to the application, and may be absent according to the application. For example, if the application is related to a system of the electronic device 100, the detailed information may have or may not have contents. If the application is related to a message, the detailed information may be the other part which sends the message.

The control unit 180 may perform operation 207 if the log information of the notification is stored in the memory 150, and perform operation 209 if the log information of the notification is not stored in the memory 150.

If the log information of the notification is stored in the memory 150, the electronic device 100 (e.g., the control unit 180) may determine a display order of the notification based on the log information in operation 207. For example, the control unit 180 may determine whether there is another notification, and if there is another notification, determine whether the received notification is faster (or shorter) than the another notification in the action time. The control unit 180 may determine the display order to expose the notification of the faster (or shorter) action time at the top (e.g., a first notification) of a display region of the display 131. Alternatively, if there no another notification, the control unit 180 may determine the display order to expose the notification received in operation 201 as the first in the display region of the display 131.

If the log information of the notification is not stored in the memory 150, the electronic device 100 (e.g., the control unit 180) may determine the display order of the notification based on a notification reception time in operation 209. If there is no log information of the notification received in operation 201, the control unit 180 may determine the display order of the notification based on the notification reception time. For doing so, the electronic device 100 may have preset a method for determining the display order based on the notification reception time. For example, the control unit 180 may determine the display order to place the notification at the center of the display region of the display 131. Alternatively, the control unit 180 may determine the display order to display the notification at the end of a notification list. Alternatively, the control unit 180 may determine to place the notification at the center of the display region, or to place at the end of the notification list based on the number of notifications displayed in the display region of the display 131. At this time, while the control unit 180 determines the display order of the notification to place it at the end of the notification list, if the notification exceeds the display region, it may determine the display order to place the notification at a preset position (e.g., the display region center).

In operation 211, the electronic device 100 (e.g., the control unit 180) may display the received notification based on the determined display order. For example, the control unit 180 may display the notification received in operation 201 on the display 131 in the display order determined in operation 207 or operation 209. For example, the control unit 180 may display the notification if the electronic device 100 receives the notification in a lock state. Alternatively, the control unit 180 may display the notification if the display 131 is turned on while the electronic device 100 is in the lock state. Alternatively, the control unit 180 may display the notification by a user input (e.g., a user input initiates from an upper bezel of the display region and drags downwards (e.g., to the display region)) while the electronic device 100 is in an unlock state.

The control unit 180 according to various embodiments may change display information of the received notification based on the display order and the attribute information of the application. The display information may include at least one of an amount, a structure, a size, a color, an image or a shape of the information provided in providing the notification. For example, the control unit 180 may provide more information for the notification placed at the top of the display region, and provide more brief information for the notification placed at the bottom of the display region. For example, the control unit 180 may determine the high priority for the disposition at the top of the display region based on the log information, and determine the low priority for the disposition at the bottom of the display region. The control unit 180 may emphasize (e.g., highlight, redden, etc.) and display the notification (e.g., the notification of the high priority) disposed at the top of the display region over the notification (e.g., the notification of the low priority) disposed at the bottom of the display region.

The control unit 180 according to various embodiments may display a first user interface which provides the notification based on the log information in operation 211. The control unit 180 may display an indicator (e.g., an icon) for switching to a second user interface which provides the notification on time basis in the first user interface. For example, if the indicator is selected while the first user interface is displayed, the control unit 180 may display the second user interface.

FIG. 3A is a diagram illustrating an example of storing log information associated with a notification according to various embodiments.

Referring to FIG. 3A, the electronic device 100 (e.g., the control unit 180) may store a notification log table 300 in the memory 150. The notification log table 300 may include log information per item. For example, the notification log table 300 may include an application 310, detailed information 320 of the application, an action time 330 and a check time 340. For example, the application 310 may pertain to the type of the application, for example, a name of the application. The detailed information 320 of the application indicates various information included in the application and may include, for example, a title, descriptions, and a name of the other party.

The control unit 180 according to various embodiments may set detailed information individually according to the application 310. For example, the control unit 180 may set the detailed information of a 'cloud' application 317 to 'descriptions', set the detailed information of a 'message' application to 'the other party name' which sends a message, and set the detailed information of a 'file manager' application 317 to 'photo share' which is a file function The action time 330 may be an average time taken to enter a corresponding application through the notification of the detailed information 320 of the application. For example, the action time for the other part name Ali 311 of the message application may be +00:10:12 (e.g., 10 minutes and 12 seconds). That is, the average action time for which the user executes the message application through the notification of the message received from Ali for a specific number of times (e.g., 3 times, 5 times) in the past may be +00:10:12. Further, the check time 340 may be an average time taken for the user to identify the notification for the detailed information 320 of the application. That is, the average check time taken for the user to identify the notification of the message received from Ali for the specific number of times (e.g., 3 times, 5 times) in the past may be +00:00:30 (e.g., 30 seconds).

The control unit 180 according to various embodiments may set different application detailed information 320 for the same application 310. For example, the detailed information 320 for the 'Message' application may include 'Ali', 'Rachel', or 'Linsay'. That is, though a message is received, since the reaction time of the user may vary depending on the other party which sends the message, the control unit 180 may set the different application detailed information 320 for the same application 310. For example, the average action time of executing the message application through the notification of the message received from Rachel 313 may be +00:23:40 (e.g., 23 minutes and 40 seconds). In addition, the average check time for the user to identify the notification of the message received from Rachel 313 may be +00:00:30 (e.g., 30 seconds). In addition, the average action time of executing the message application through the notification of the message received from Linsay 315 may be +06:01:30 (e.g., 6 hours, 1 minute and 30 seconds). In addition, the average check time for the user to identify the notification of the message received from Linsay 315 may be +00:00:40 (e.g., 40 seconds).

The control unit 180 may count the user reaction time (e.g., the action time, the check time) every time the notification (or the message) corresponding to the detailed information 320 of the application is received, and calculate an average value of the counted time. For example, if the number of times for calculating the action time is 5 times, the control unit 180 may, upon receiving a message first from Ali after starting to calculate the action time, store the action time or the check time for the first message. If the number of the message receptions from Ali satisfies 5 times, the control unit 180 may calculate an average value of the action time or the check time of the five message receptions from Ali. In this case, the control unit 180 may store time log information (e.g., the action time and the check time) of which the detailed information of the message application is 'Ali' in the notification log table 300. Next, If a sixth message is received from Ali, the control unit 180 may remove the action time or the check time of the first message received, and calculate an average value of the action time or the check time from the second message to the sixth message. That is, the control unit 180 may update the log information recorded in the notification log table 300 in real time.

Figure 3B:
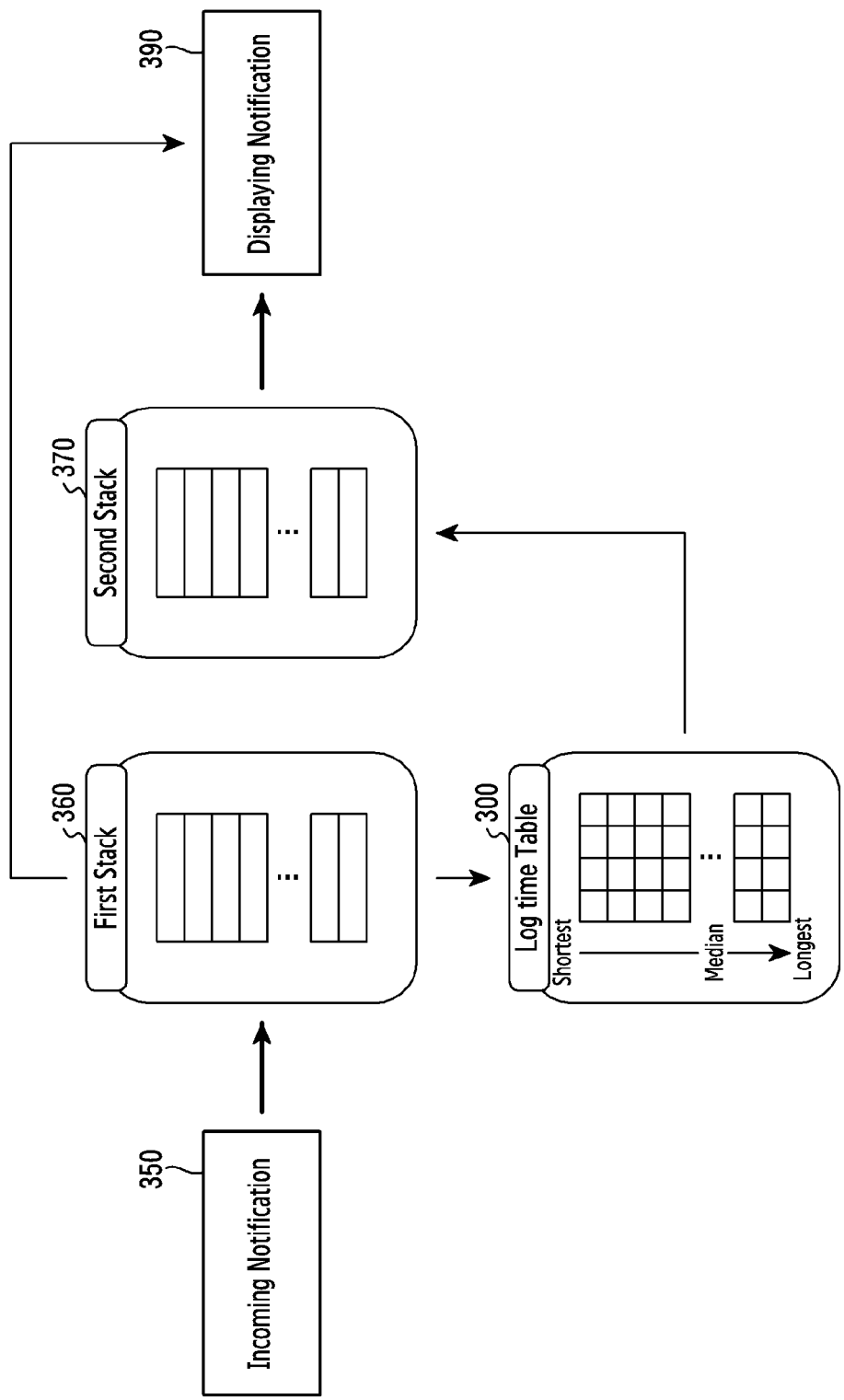
FIG. 3B is a diagram illustrating an example of a stack structure for storing notifications according to various embodiments.

FIG. 3B is a diagram illustrating an example of a stack structure for storing notifications according to various embodiments.

Referring to FIG. 3B, the electronic device 100 (e.g., the control unit 180) may, if receiving a notification 350, may store it in a first stack 360 in order it is received. The first stack 360 may be a first-in first-out recording scheme, or a last in last out recording scheme. The control unit 180 may generate a notification list in the notification reception time order in a different manner according to the recording scheme of the first stack 360. The control unit 180 may generate a user interface 390 which provides the notification list based on the notification reception time from the first stack 360.

In addition, the control unit 180 may determine whether log information is recorded in the notification log table 300 in response to attribute information of the received notification. If the log information is recorded in the notification log table 300 in response to the attribute information of the received notification, the control unit 180 may determine the display order of the received notification based on the log information. The control unit 180 may store the notification (or a notification identifier) in the second stack 370 in the determined display order. The control unit 180 may generate a user interface 390 which provides the notification list based on the log information from the second stack 370.

Figure 4:
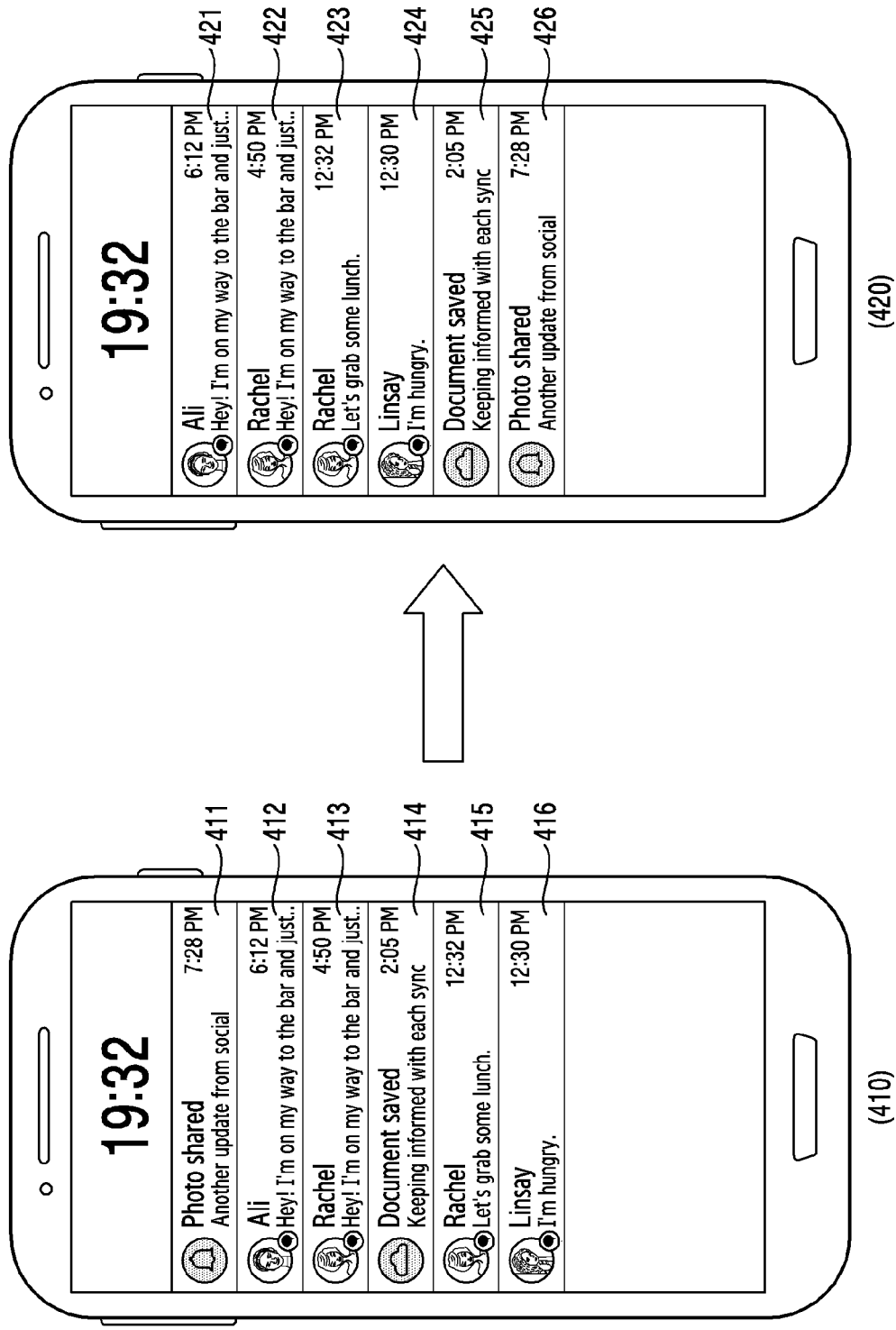
FIG. 4 is a diagram illustrating an example of a user interface for providing a notification based on log information according to various embodiments.

FIG. 4 is a diagram illustrating an example of a user interface for providing a notification based on log information according to various embodiments.

Referring to FIG. 4, the electronic device 100 (e.g., the control unit 180) may provide a first user interface 410 based on a notification reception time. The first user interface 410 may adopt a notification displaying method which exposes the latest notification received based on a current time at the top of the display region. The notification list included in the first user interface 410 may not be identified by the user after the notification is received. For example, the first user interface 410 may sequentially display a first notification 411 received at 7:28 PM, a second notification 412 received at 6:12 PM, a third notification 413 received at 4:50 PM, a fourth notification 414 received at 2:05 PM, a fifth notification 415 received at 12:32 PM and a sixth notification 416 received at 12:30 PM based on current time "19:32". That is, the first user interface 410 may expose the notification at the bottom of the display region if a difference from the current time to the notification reception time increases.

In general, since the latest notification received is disposed at the top (e.g., the first notification) of the display region, the user may identify the notification exposed at the top of the display region more easily than the notification exposed at the bottom (e.g., the last order notification) of the display region. Thus, if the notification is exposed based on the notification reception time, a notification determined to be important may be received first while the user is not able to identify the received notification for a while, and displayed as the last order of the notification list. In this case, though the notification important to the user is received, the user may not easily recognize it.

The electronic device 100 (e.g., the control unit 180) may provide a second user interface 420 based on log information associated with the notification. The second user interface 420 may adopt a notification displaying method which exposes a notification determined to be important to the user based on the user reaction time in the past with respect to the received notification at the top of the display region. In this case, the notification determined to be important to the user is exposed at the top of the display region although its reception time is faster than other notification, and thus the user may easily identify the notification reception.

The control unit 180 may determine the display order of the notification in ascending order of the action time or the check time associated with the received notification regardless of the notification reception time. For example, the second user interface 420 may sequentially display a first notification 421 (or a message) received from Ali, a second notification 422 received from Rachel, a third notification 423 received from Rachel, a fourth notification 424 received at 12:30 PM, a fifth notification 425 received at 2:05 PM and a sixth notification 426 received at 7:28 based on the log information. That is, the second user interface 420 may expose at the top or the bottom of the display region according to the importance (e.g., the first notification identified by the user) of the received notification. Although not shown, the control unit 180 may change the display information of the notification exposed at the top (e.g., the first notification 421) of the display region differently from other notifications.

Figure 5:
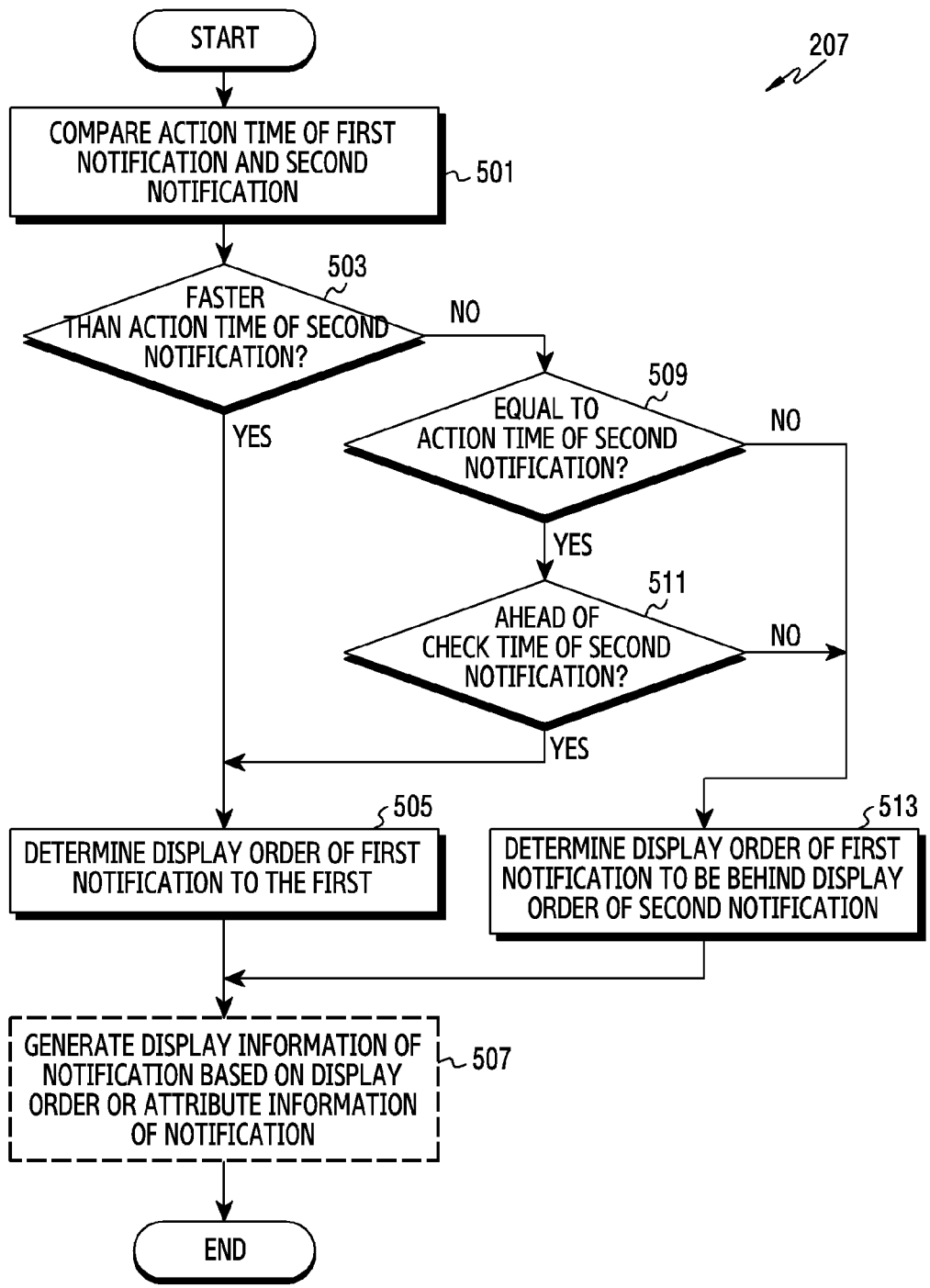
FIG. 5 is a diagram illustrating a method for determining a display order of a notification based on log information according to various embodiments.

FIG. 5 is a diagram illustrating a method for determining a display order of a notification based on log information according to various embodiments. FIG. 5 may be the flowchart which specifies operation 207 of FIG. 2. In addition, FIG. 5 exemplifies a case where there is other notification not identified by the user than a received notification.

Referring to FIG. 5, in operation 501, the electronic device 100 (e.g., the control unit 180) may compare an action time of a first notification and a second notification. Herein, the first notification may indicate the notification received in operation 201 of FIG. 2, and the second notification may indicate a notification received before the first notification and not identified by the user. The meaning that the second notification is received before the first notification may indicate that the notification reception time of the second notification is ahead of the notification reception time of the first notification. That is, the latest notification received from the current time may be the first notification.

In operation 503, the electronic device 100 (e.g., the control unit 180) may determine whether the action time of the first notification is faster than the action time of the second notification. For example, the first notification may be a message received from Ali, and the second notification may be a message received from Rachel. The user may have identified the message from Ali earlier than the message received from Rachel for a specific number of times (e.g., 3 times, 5 times) in the past. In this case, the action time of the first notification may be shorter than the action time of the second notification. The short action time for entering the application associated with the notification through the notification may indicate that the time from the notification reception time to the user's notification identifying time is short. The short action time may indicate the message important to the user. The more important message to the user, the higher priority of the display order.

The control unit 180 may perform operation 505 if the action time of the first notification is ahead of the action time of the second notification, and perform operation 509 if the action time of the first notification is behind the action time of the second notification.

If the action time of the first notification is ahead of the action time of the second notification, the electronic device 100 (e.g., the control unit 180) may determine the display order of the first notification to the first in operation 505. For example, if the notification list to be displayed on the display 131 includes the first notification and the second notification, the control unit 180 may determine the display order between the two notifications. The control unit 180 may determine the notification of the shorter (or faster) action time among the first notification and the second notification to the first display order. For example, if first, second, and third display orders are determined in sequence from the top of the display region toward the bottom, the first display order may indicate the first order displayed at the top of the display region. In this case, the control unit 180 may display the first notification at the top of the display region, and display the second notification below the first notification.

In operation 507, the electronic device 100 (e.g., the control unit 180) may generate display information of the notification based on the display order or attribute information of the notification. The display information may include at least one of an amount, a structure, a size, a color, an image or a shape of the information provided when the notification is provided. The display information may differ per attribute information of the notification (e.g., the type of the application). For example, there may be a notification displayed greater than other notification according to characteristic of the application. In addition, the control unit 180 may change the display information of the notification based on the display order. For example, the control unit 180 may determine that the notification disposed at the top of the display region is the important notification to the user, and provide more notification information than other notifications. In addition, the control unit 180 may determine that the notification disposed at the bottom of the display region is not the important notification to the user, and provide less notification information than other notifications. Operation 507 may be performed or may not be performed according to setting information of the electronic device 100 or user's setting.

In operation 509, the electronic device 100 (e.g., the control unit 180) may determine whether the action time of the first notification is the same as the action time of the second notification. If the action times are the same, they have the same priority, and accordingly the control unit 180 may determine the display order based on the check time. That is, the control unit 180 may identify the action time first in determining the display order, and identify the check time secondly.

The control unit 180 may perform operation 511 if the action time of the first notification and the action time of the second notification are the same, and perform operation 513 if the action time of the first notification and the action time of the second notification are not the same.

If the action time of the first notification and the action time of the second notification are the same, the electronic device 100 (e.g., the control unit 180) may determine whether the check time of the first notification is ahead of the check time of the second notification in operation 511. For example, the first notification may be a message received from Ali, and the second notification may be a message received from Rachel. The user may have identified the message received from Ali ahead of the message received from Rachel during a specific number of times (e.g., 3 times, 5 times) in the past. In this case, the check time of the first notification may be shorter than the check time of the second notification. The short check time may indicate the important message to the user.

The control unit 180 may perform operation 505 if the check time of the first notification is ahead of the check time of the second notification, and perform operation 513 if the check time of the first notification is behind the check time of the second notification.

If the action time of the first notification is behind (longer than) the action time of the second notification, or if the check time of the first notification is behind (or longer than) the check time of the second notification, the electronic device 100 (e.g., the control unit 180) may determine the display order of the first notification to be behind the display order of the second notification in operation 513. For example, if a notification list to be displayed on the display 131 includes the first notification and the second notification, the control unit 180 may determine the second notification of the shorter (or earlier) check time among the first notification and the second notification to the first display order. That is, the control unit 180 may display the second notification in the order for displaying the first notification at the top of the display region, and display the first notification below the second notification.

After performing operation 513, the control unit 180 may perform or may not perform operation 507. For example, if performing operation 505 and then performing operation 507, the control unit 180 may change the display information of the first notification differently from the second notification. For example, if both of the first notification and the second notification are messages, the control unit 180 may generate the display information to include a message title, entire content, the other party's name, a message reception time, and an action button for the first notification. By contrast, the control unit 180 may generate the display information to include a message title, part of content and the other party's name for the second notification.

Alternatively, if performing operation 505 and then performing operation 507, the control unit 180 may change the display information of the second notification differently from the first notification. For example, the control unit 180 may generate the display information to include the message title, part of content and the other party's name for the first notification. By contrast, the control unit 180 may generate the display information to include the message title, the entire content, the other party's name, the message reception time, and the action button for the second notification.

While one second notification is described in FIG. 5 for the understanding of the invention, the second notification may be one or more. That is, while the notification list includes the first notification and the second notification in FIG. 5 by way of example, if the notification list includes the first notification, the second notification, and a third notification, the first notification may be disposed below the second notification and the third notification, or between the second notification and the third notification.

Figure 6:
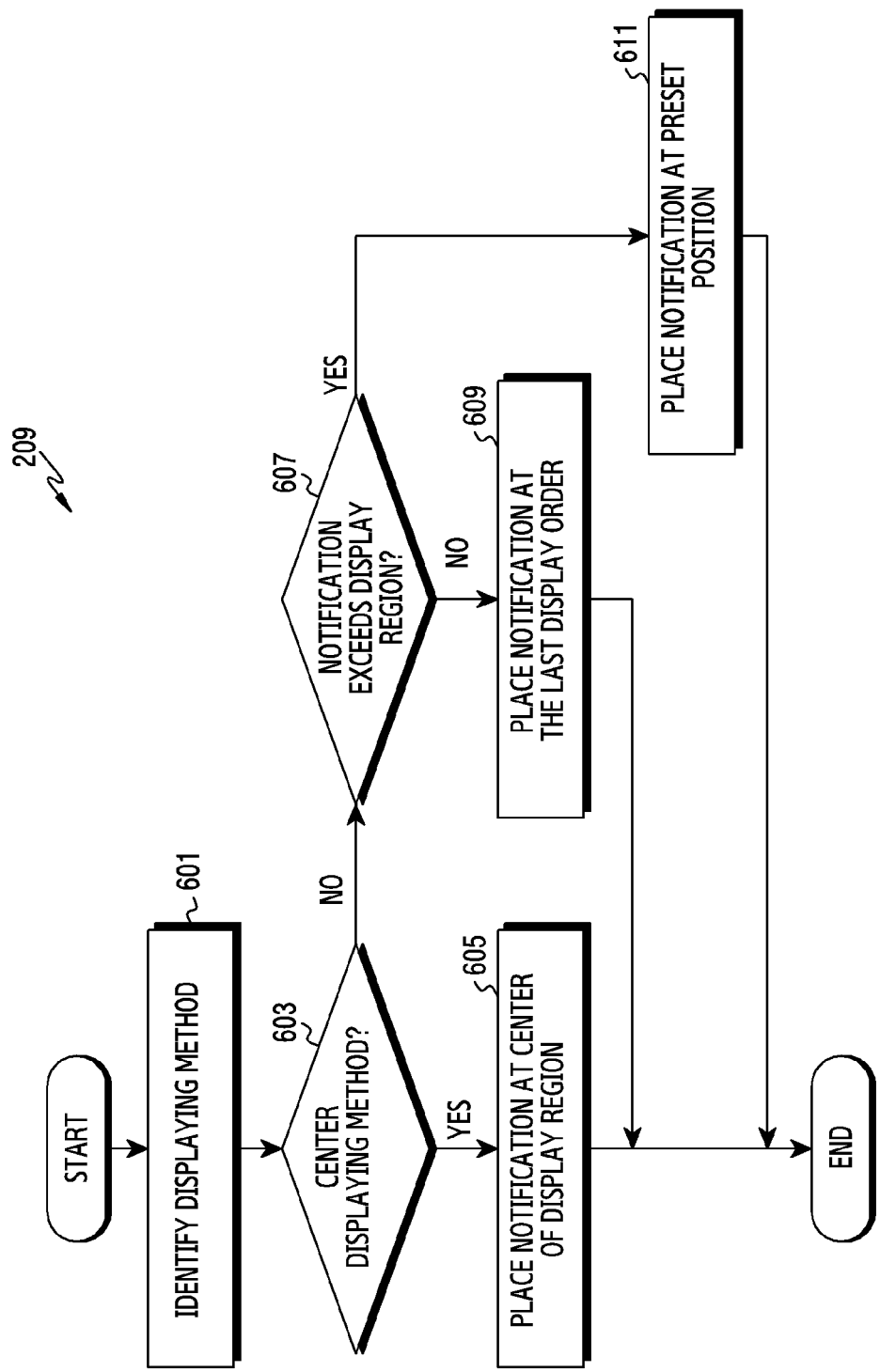
FIG. 6 is a diagram illustrating a method for determining a display order of a notification based on a notification reception time according to various embodiments.

FIG. 6 is a diagram illustrating a method for determining a display order of a notification based on a notification reception time according to various embodiments. FIG. 6 may be the flowchart specifying operation 209 of FIG. 2. Further, FIG. 6 exemplifies a case where there is more other notification not identified by the user than the received notification.

Referring to FIG. 6, in operation 601, the electronic device 100 (e.g., the control unit 180) may identify a displaying method. The electronic device 100 may set the displaying method for determining the notification display order if there is no log information associated with the notification. For example, the displaying method may be a center displaying method or a last displaying method.

In operation 603, the electronic device 100 (e.g., the control unit 180) may determine whether the displaying method is the center displaying method.

The control unit 180 may perform operation 605 if the displaying method is the center displaying method, and perform operation 607 if the displaying method is not the center displaying method (e.g., the last displaying method).

If the displaying method is the center displaying method, the electronic device 100 (e.g., the control unit 180) may place the notification at the center of the display region of the display 131 in operation 605. For example, the control unit 180 may determine the display order to display the notification at the center of the display region by considering a display size of the display 131. The display 131 may display five notifications (e.g., corresponding to the notification which is default display information) at a time, which may differ depending on the display size of the display 131 or the notification displaying method. In this case, the control unit 180 may determine the notification received in operation 201 to a third display order which is the middle of the display region. Alternatively, to display three notifications in total including the received notification based on the display size of the display 131 and the number of the notifications, the control unit 180 may determine the display order of the notification to the third display order.

If the displaying method is not the center displaying method (e.g., the last displaying method), the electronic device 100 (e.g., the control unit 180) may determine whether the received notification exceeds the display region, in operation 607. For example, if there is no log information associated with the notification, the control unit 180 may display the received notification at the last display order of the notification list. At this time, if a great number of notifications are included in the notification list, if the received notification is disposed at the last order, it may not be displayed in the display region. To prevent such a case, the control unit 180 may determine whether the received notification disposed at the last order of the notification list exceeds the display region. For doing so, the control unit 180 may determine the number of the notifications to display including the received notification, and if the number of the notifications exceeds a preset number (e.g., six), the control unit 180 may determine that the received notification exceeds the display region.

The control unit 180 according to various embodiments may determine whether the received notification exceeds the display region based on the display size of the display 131 or the display information of the notification. While originally up to five notifications may be displayed at a time, if the size of one notification is great and four notifications are displayed at a time, the received notification, which is determined by the control unit 180 to the fifth display order, may exceed the display region. Considering such a case, the control unit 180 may determine whether the received notification exceeds the display region based on the display size of the display 131 or the display information of the notification. The number of the notifications displayable at a time may indicate the number of notifications viewable by the user without scrolling through the notification list.

The control unit 180 may perform operation 609 if the received notification does not exceed the display region, and perform operation 611 if the received notification exceeds the display region.

If the received notification does not exceed the display region, the electronic device 100 (e.g., the control unit 180) may place the received notification at the last display order of the notification list in operation 609. If the notification list includes four notifications, the control unit 180 may determine the display order of the received notification to a fifth display order.

If the received notification exceeds the display region, the electronic device 100 (e.g., the control unit 180) may place the notification at a preset position, in operation 611. For example, if displaying five notifications at a time, the control unit 180 may determine the display order of the received notification to the fifth display order which is positioned on the bottom of the display region. Alternatively, the control unit 180 may determine the display order of the received notification to the fourth display order which is ahead of the last by one. Alternatively, the control unit 180 may determine the display order of the notification based on the display size of the display 131 or the display information of the notification.

Figure 7:
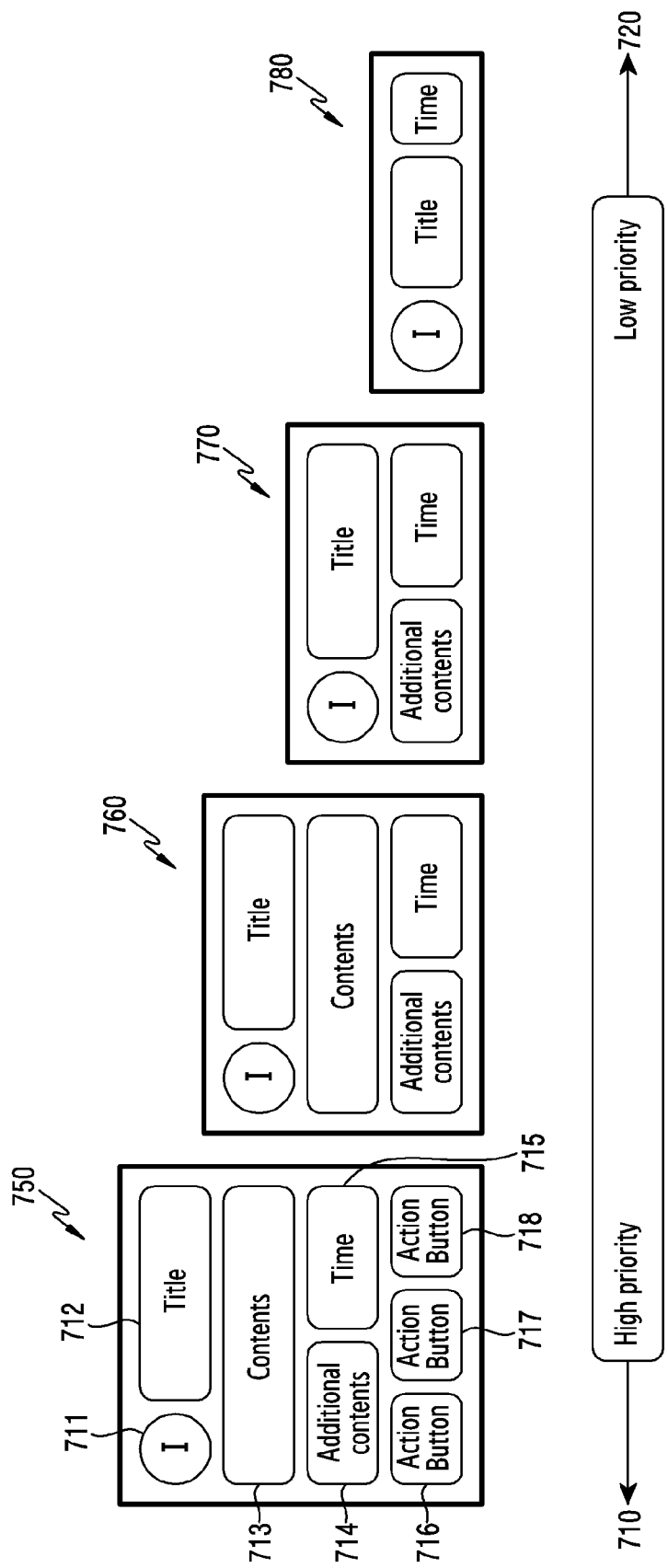
FIG. 7 is a diagram illustrating an example of notification display information according to various embodiments.

FIG. 7 is a diagram illustrating an example of notification display information according to various embodiments.

Referring to FIG. 7, the electronic device 100 (e.g., the control unit 180) may generate display information of a notification based on a display order of the notification and attribute information of an application. The display information may include at least one of an amount, a structure, a size, a color, an image or a shape of the information provided when the notification is provided. For example, the control unit 180 may determine high importance and provide more information than other notification with respect to a notification disposed at the top of the display region, and determine low importance and provide more brief information than other notification with respect to a notification disposed at the bottom of the display region.

In FIG. 7, the priority may increase 710 to the right, and the priority may decrease 720 to the left. For example, first display information 750 and second display information 760 may be higher in priority than third display information 770 and fourth display information.

The first display information 750 of the highest priority 710 may include an image 711 of an application associate with the notification, a notification title 712, notification contents 713, additional contents 714, a notification reception time 715, and action buttons (e.g., 716~718). The image 711 of the application associate with the notification may be an icon of the application. The user may determine the notification merely with the icon of the application. The notification title 712 or the notification contents 713 may correspond to detailed information of the application. For example, if the notification is a message, the notification title 712 may be a message title or other party's name which sends the message. The contents 713 of the notification may be contents (main body) of the message. The additional contents 714 may indicate additional information not included in the title 712 or the contents 713 of the notification. For example, if the notification is a message, the additional contents 714 may be the other party's phone number, the other party's group or the other party's image stored in a phonebook of the memory 150. The action button may be generated by the control unit 180 based on the application associated with the notification, or may be generated by the application associated with the notification. The action button may be one or more. For example, if the notification is a message, the action button may include a reply button (e.g., a first action button 716), an archive button (e.g., a second action button 717), and a delete button (e.g., a third action buttons 718).

The second display information 760 lower than the first display information 750 in priority may include an image of an application associated with the notification, a notification title, notification contents, additional contents and a notification reception time. The third display information 770 lower than the second display information 760 in priority may include an image of an application associated with the notification, a notification title, notification contents, additional contents and a notification reception time. The fourth display information 780 of the lowest priority 720 may include an image of an application associated with the notification, a notification title, and a notification reception time.

While it has been described that the amount included in the display information is great or small according to the priority and accordingly its size increases or decreases in FIG. 7, the control unit 180 may change the structure of the display information based on the display order of the notification and the attribute information of the application, change, emphasize and display the color of the display information, or differently configure the shape of the display information.

Figure 8:
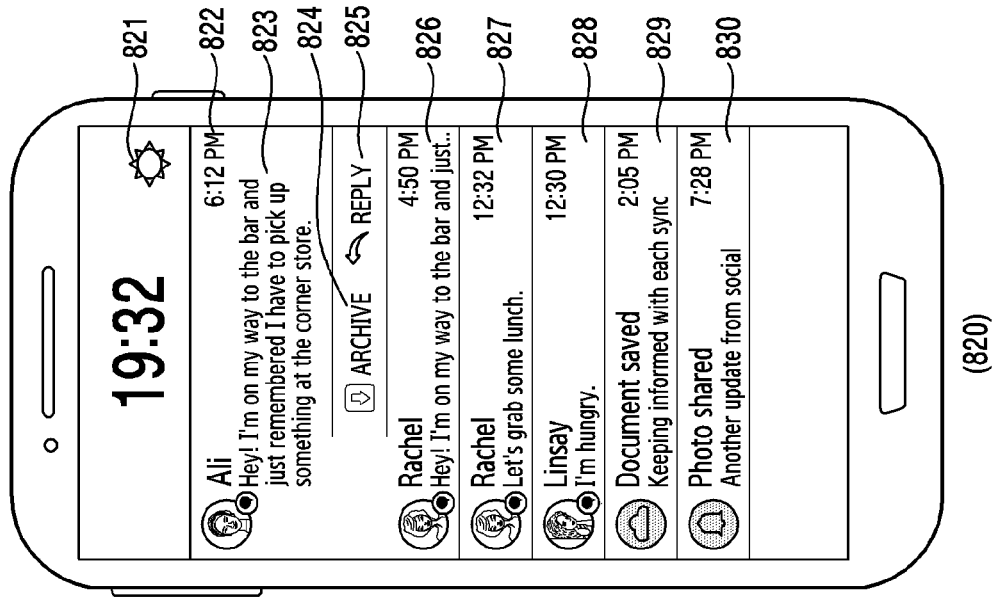
FIG. 8 is a diagram illustrating an example of a user interface which provides a notification by changing display information according to various embodiments.
Figure 8:
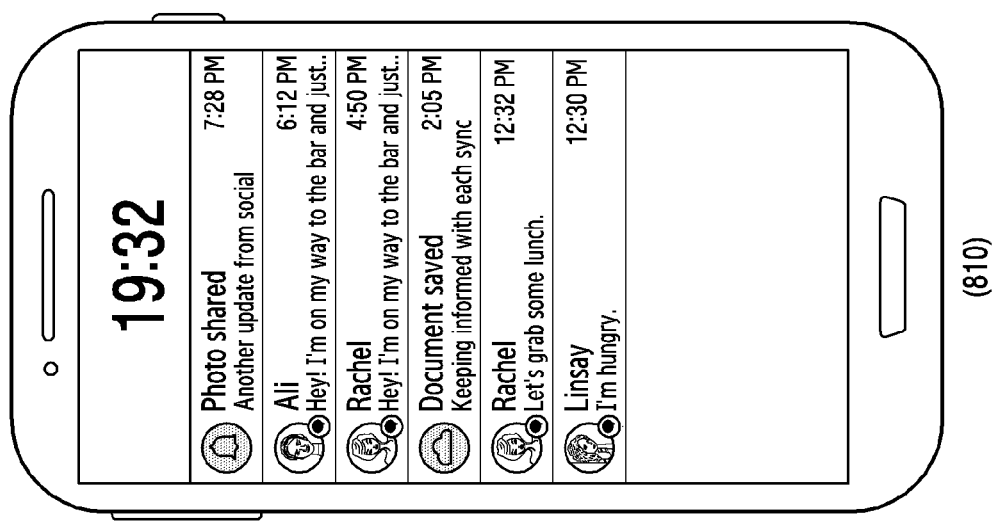

FIG. 8 is a diagram illustrating an example of a user interface which provides a notification by changing display information according to various embodiments.

Referring to FIG. 8, the electronic device 100 (e.g., the control unit 180) may provide a first user interface 810 for providing a notification based on a notification reception time. The first user interface 810 may adopt the notification displaying method which exposes the latest notification received at the top of the display region based on the current time. In addition, the electronic device 100 (e.g., the control unit 180) may display a second user interface 820 which provides notifications based on log information. The second user interface 820 may adopt the notification displaying method which exposes a notification determined to be important to the user at the top of the display region based on a user's reaction time in the past to the received notification. In addition, the second user interface 820 may include an indicator 821 for switching to the first user interface 810. If the indicator 821 is selected from the user while the second user interface 820 is displayed on the display 131, the control unit 180 may display the first user interface 810 on the display 131.

The control unit 180 may determine a display order of the notification in ascending order of an action time or a check time associated with the received notification. In addition, the control unit 180 may change the display information of the notification based on the display order and attributes of the application associated with the notification. For example, the second user interface 820 may sequentially display a first notification 822 (or a message) received from Ali, a second notification 826 received from Rachel, a third notification 827 received from Rachel, a fourth notification 828 received at 12:30 PM, a fifth notification 829 received at 2:05 PM and a sixth notification 830 received at 7:28. The control unit 180 may change the display information of the first notification 822 differently from the display information of the other notifications (e.g., the second notification 826 through the sixth notification 830) in the second user interface 820. For example, the control unit 180 may include a notification title (e.g., Ali), full notification contents 823 (e.g., Hey! I'm on my way to the bar and just remembered I have to pick up something at the corner store), a notification reception time (e.g., 6:12 PM), a first action button 824 and a second action button 825. The first action button 824 may be an archive button, and the second action button 825 may be a reply button.

Comparing the display information of the first notification 822 and the display information of the second notification 826, the display information of the second notification 826 may include the notification title (Rachel), part of the notification contents (e.g., Hey! I'm on my way to the bar and just . . . ) and the notification reception time (e.g., 4:50 PM). That is, the first notification 822 and the second notification 826 pertain to the same message application, but the display information of the first notification 822 includes more information than the display information of the second notification 826. The control unit 180 may determine the display order of the notification and change (or generate) the display information of the notification according to the importance (e.g., the first notification identified by the user) of the received notification.

Figure 9:
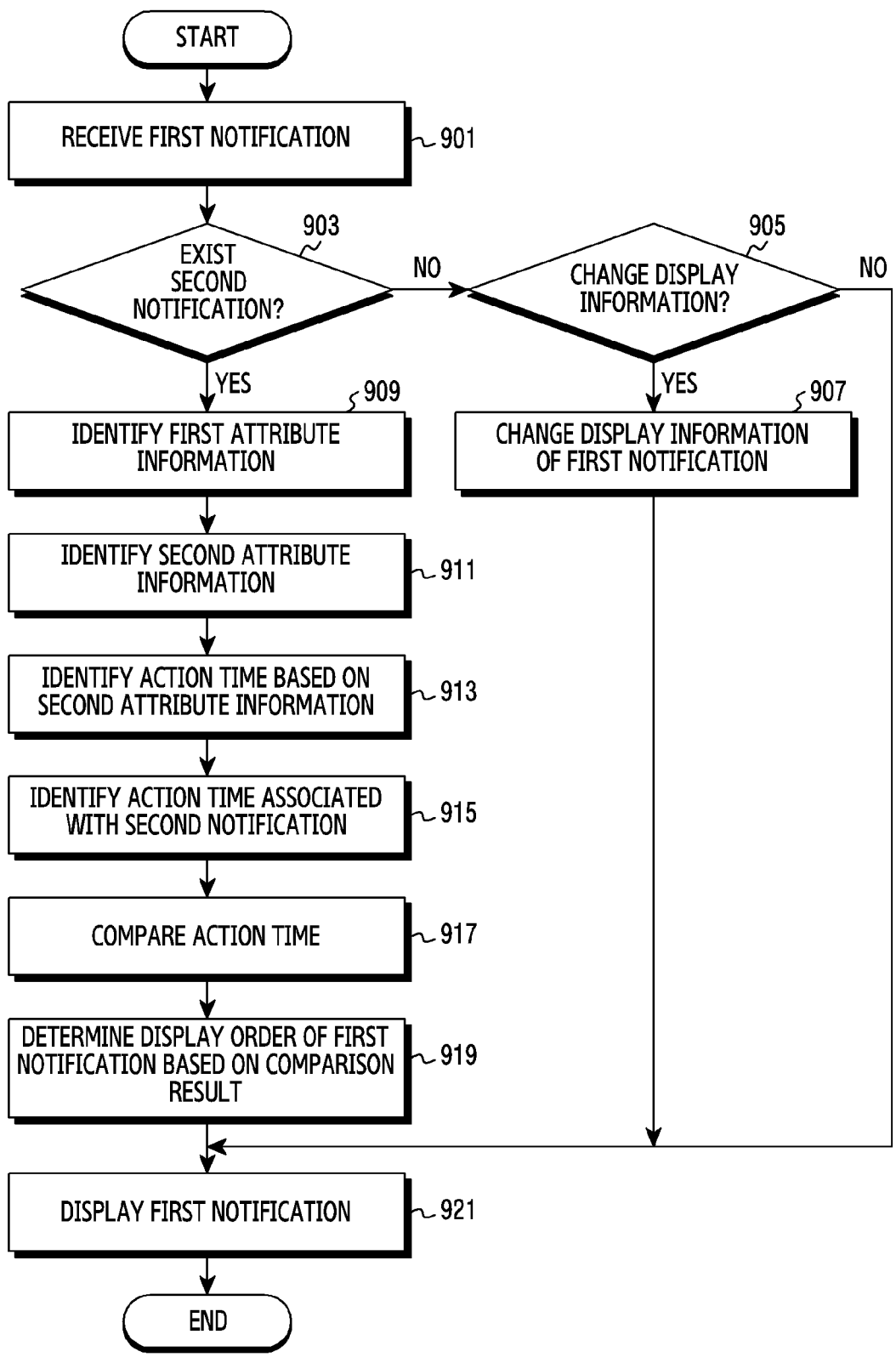
FIG. 9 is a flowchart illustrating a notification displaying method of an electronic device according to various embodiments.

FIG. 9 is a flowchart illustrating a notification displaying method of an electronic device according to various embodiments.

Referring to FIG. 9, in operation 901, the electronic device 100 (e.g., the control unit 180) may receive a first notification. The control unit 180 may receive a message (e.g., a push message) from a server or the other electronic device (e.g., via a base station) through the wireless communication unit 110 on a periodic basis or in real time for status check, update, and an application (or a program) installed on the electronic device 100. Since operation 901 is similar or identical to operation 201, its detailed explanations may be omitted.

In operation 903, the electronic device 100 (e.g., the control unit 180) may determine whether there is a second notification. The second notification may indicate a notification received ahead of the first notification, and not identified by the user. The second notification may be one or more. While the single second notification is explained for ease of description in the following, the second notification is not limited to one by the descriptions.

The control unit 180 may perform operation 909 if there is the second notification, and perform operation 905 if there is no the second notification.

If there is no second notification, the electronic device 100 (e.g., the control unit 180) may determine whether to change display information of the first notification in operation 905. After the first notification is received, if there is no second notification, the display order of the first notification may be determined to the first display order at the top of the display region. This is because there is no other notification than the first notification, and the operation of determining the display order may not be performed. Hence, the control unit 180 may perform the operation of whether to change the display information of the first notification. The control unit 180 according to various embodiments may determine whether to change the display information of the first notification by considering the display order of the first notification or characteristics of an application associated with the first notification.

The control unit 180 according to various embodiments may perform operation 903, and then perform operation 921 without performing operation 905. That is, the control unit 180 may display the first notification without changing the display information of the first notification.

The control unit 180 may perform operation 907 if changing the display information of the first notification, and perform operation 921 if not changing the display information of the first notification.

In operation 907, the electronic device 100 (e.g., the control unit 180) may change the display information of the first notification. For example, since there is no other notification than the first notification, the control unit 180 may change the display information of the first notification by considering the display size of the display 131 or the characteristics of the application associated with the first notification. For example, the control unit 180 may increase the size of the display information by including more additional information to the display information of the first notification.

If the second notification is present, the electronic device 100 (e.g., the control unit 180) may determine first attribute information of the first notification in operation 909. The first attribute information may be a type of the application of the first notification. For example, the control unit 180 may retrieve the first attribute information (e.g., the application 310) associated with the first notification from the notification log table 300 of FIG. 3A.

In operation 911, the electronic device 100 (e.g., the control unit 180) may identify second attribute information of the first notification. The second attribute information may be detailed information (e.g., title, content, and other party information) of the application associated with the second notification. For the same application, each time log information (or time information) may differ according to the detailed information of the application. For example, the control unit 180 may retrieve the second attribute information (e.g., the detailed information 320 of the application) corresponding to the first attribute information (e.g., the application 310) of the first notification from the notification log table 300 of FIG. 3A.

In operation 913, the electronic device 100 (e.g., the control unit 180) may identify the action time based on the second attribute information. Referring to FIG. 3A, the control unit 180 may identify the action time '+07:00:30 (7 hours and 30 seconds)' for the detailed information (e.g., Document Saved) of the application corresponding to the cloud application 317, and identify the action time '+07:00:30 (7 hours and 30 seconds)' for the detailed information (e.g., Photo Shared) of the application corresponding to the file manager application 319.

In operation 915, the electronic device 100 (e.g., the control unit 180) may identify the action time associated with the second notification. Referring to FIG. 3A, the control unit 180 may identify the action time '+00:10:12 (10 minutes and 12 seconds)' for the detailed information (e.g., Ali) of the application corresponding to the message application 311.

While it has been described that operation 909 through operation 913 are performed and operation 915 is performed in FIG. 9, operation 915 may be performed first and operation 909 through operation 913 may be performed. Alternatively, operation 915 and operation 909 through operation 913 may be performed at the same time. This is only a matter of implementation and does not limit the contents of the invention.

In operation 917, the electronic device 100 (e.g., the control unit 180) may compare the action time of the first notification and the action time of the second notification. The control unit 180 may determine whether the action time of the first notification is faster (or shorter) than the action time of the second notification, whether the action time of the first notification is the same as the action time of the second notification, or whether the action time of the first notification is longer (or longer time) than the action time of the second notification.

In operation 919, the electronic device 100 (e.g., the control unit 180) may determine the display order of the first notification based on the comparison result. For example, if the action time of the first notification is ahead of the action time of the second notification, the control unit 180 may determine the display order of the first notification to be higher than the display order of the second notification. Alternatively, if the action time of the first notification is the same as the action time of the second notification, the control unit 180 may determine whether the check time of the first notification is ahead of the check time of the second notification. If the check time of the first notification is ahead of the check time of the second notification, the control unit 180 may determine the display order of the first notification to be higher than the display order of the second notification. Alternatively, if the action time of the first notification is behind (longer than) the action time of the second notification, or if the check time of the first notification is behind (longer time) the check time of the second notification, the control unit 180 may determine the display order of the first notification to be lower than the display order of the second notification.

Operation 919 may be performed, and then operation 905 or operation 907 may be performed. Alternatively, operation 919 may be performed, and then operation 921 may be performed without performing operation 905 or operation 907.

In operation 921, the electronic device 100 (e.g., the control unit 180) may display the first notification. For example, the control unit 180 may display the notification received in operation 901 on the display 131 according to the display order determined in operation 919. Since operation 921 is similar or identical to operation 211, its detailed explanations may be omitted.

Figure 10:
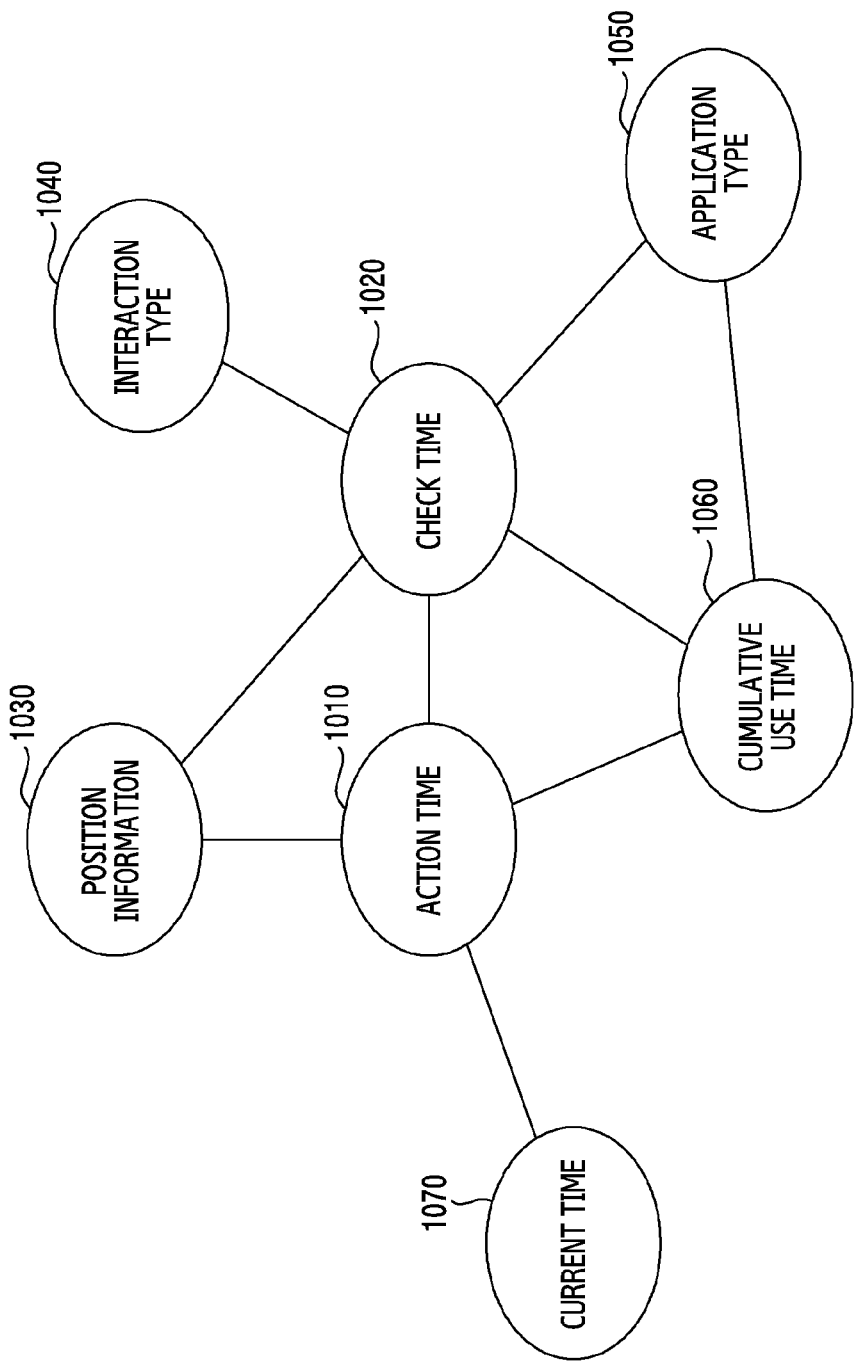
FIG. 10 is a diagram illustrating an example of various information for determining a display order of a notification according to various embodiments.

FIG. 10 is a diagram illustrating an example of various information for determining a display order of a notification according to various embodiments.

Referring to FIG. 10, the electronic device 100 (e.g., the control unit 180) may determine the display order of the notification by further considering position information 1030, an interaction type 1040 associated with the notification check, a type 1050 of the application associated with the notification, a cumulative use time 1060 of the application associated with the notification, or a current time 1070 together with time log information (e.g., an action time 1010 and a check time 1020) (or time information) associated with the notification. The position information 1030 may indicate a position of the electronic device 100 in obtaining the action time or the check time. For example, the control unit 180 may differently determine the display order of the notification based on the log information and the position information 1030. A notification first identified at first position information (e.g., company) and a notification first identified at second position information (e.g., home) may be different. Hence, the control unit 180 may determine the display order of the notification based on the position of the received notification. The notification log table 300 of FIG. 3A may differently store the time log information per position information.

The interaction type 1040 associated with the notification check may be at least one of long press, swipe, pinch-in or pinch-out. The control unit 180 may apply a different weight according to the interaction type 1040 associated with the notification check, and set a different priority of the check time according to the weight. For example, the control unit 180 may set the long press check to a lower priority than the swipe check time, and set the pinch-in check time to a lower priority than the pinch-out check time. Thus, if the action time and the check time are the same, the control unit 180 may determine the display order of the notification by considering the priority of the check time. The control unit 180 may determine the display order of the notification of the high priority of the check time notification to be disposed above the display order of the notification of the low priority of the check time.

The cumulative use time 1060 of the application associated with the notification may include a cumulative time for which the electronic device 100 executes the application associated with the notification in a foreground state (e.g., the state where the application is displayed on the display 131) and a cumulative time for which the electronic device 100 executes the application associated with the notification in a background state (e.g., the state where the application is not displayed on the display 131). The control unit 180 may determine the display order of the notification of the high application cumulative time to be disposed above the display order of the notification of the low application cumulative time.

The control unit 180 according to various embodiments may determine the display order of the notification based on the time when the action time or the check time is obtained. For example, a notification identified first in the morning (e.g., 09:00~12:00), a notification identified first at lunch time (e.g., 12:00~14:00), or a notification identified first in the afternoon (e.g., 14:00~20:00) may be different from each other. Alternatively, a notification identified first on weekends and a notification identified first on weekdays may be different from each other. Hence, the control unit 180 may apply a different weight to the display order of the notification by considering the time zone or the day of the received notification. The control unit 180 according to various embodiments may determine the display order of the notification by comprehensively considering the position information 1030 and the current time 1070.

An operating method of an electronic device according to various embodiments may include identifying log information associated with a notification received, determining a display order of the notification based on the log information, and displaying the notification based on the determined display order.

The log information may include at least one of time information, position information, interaction information or application information.

The time information may include an action time for entering an application associated with the notification through the notification and a check time for a user to identify the notification.

Determining the display order of the notification based on the log information may include determining whether there is another notification, if there is the another notification, identifying the action time based on attribute information of the notification, comparing the action time of the notification with an action time of the another notification, and determining the display order of the notification based on the comparison result.

Determining the display order of the notification based on the comparison result may include, if the action time of the notification is ahead of the action time of the another notification, determining the display order of the notification to be above the display order of the another notification.

Determining the display order of the notification based on the comparison result may include, if the action times are the same, determining the display order of the notification of the faster check time to be above the display order of the notification of the slower check time.

In the embodiment of the present invention, the recording medium may include a computer readable recording medium which restores a program for executing operations of identifying log information associated with a notification received, determining a display order of the notification based on the log information, and displaying the notification based on the determined display order.

The embodiments disclosed in the specification and drawings merely present specific examples to easily explain details of the present invention and to ease the understanding, and do not limit the range of the present invention. Therefore, the scope of the present invention should be construed as encompassing all modifications or modified forms derived based on the technical idea of the present invention as well as the disclosed embodiments.

What is claimed is:

1. An electronic device comprising:
   a communication unit;
   a memory configured to store log information associated with at least one notification received through the communication unit, the log information comprising a user reaction time indicating an average time interval, from a time at which each notification is received to a time at which a user reaction related to each notification is received, to each notification;
   a display; and
   a processor functionally coupled with the memory, the communication unit or the display, wherein the processor is configured to:
      receive a notification through the communication unit,
      identify log information associated with the received notification from the stored log information,
      determine a display order of the received notification based on the identified log information,
      display the received notification on the display based on the determined display order,
      determine whether there is another notification,
      in response to determining there is the another notification, identify an action time of the another notification, and
      compare the action time of the received notification with an action time of the another notification, and determine the display order of the notification based on a comparison result, and
   wherein the user reaction time comprises an action time for entering an application associated with the received notification through the received notification and a check time for the user to identify the received notification.

2. The electronic device of claim 1, wherein the log information further comprises at least one of position information, interaction information or application information.

3. The electronic device of claim 1, wherein the processor is configured to:
   in response to determining that the action time of the received notification is ahead of the action time of the another notification, determine the display order of the received notification to be above the display order of the another notification.

4. The electronic device of claim 1, wherein the processor is configured to control the display to display a display information of a notification positioned at a top of the display order differently from display information of a notification positioned at a bottom of the display order.

5. The electronic device of claim 1, wherein the processor is configured to change display information of the received notification based on the display order and attribute information of the received notification.

6. The electronic device of claim 1, wherein the processor is configured to:
   in response to determining that the log information is not stored, determine the display order of the received notification to a center of a display region of the display based on a notification reception time.

7. The electronic device of claim 1, wherein the processor is configured to:

in response to determining that the log information is not stored, determine the display order of the received notification to a last display order of a notification list based on a notification reception time.

8. The electronic device of claim 1, wherein the processor is configured to include an indicator for switching a first user interface which provides a notification based on the log information to a second user interface which provides a notification based on a notification reception time.

9. An operating method of an electronic device, comprising:
   receiving a notification through a communication unit;
   identifying log information associated with received notification, wherein the log information is associated with at least one notification received through the communication unit, and comprises a user reaction time indicating an average time interval, from a time at which each notification is received to a time at which a user reaction related to each notification is received, to each notification;
   determining a display order of the received notification based on the identified log information; and
   displaying the received notification based on the determined display order,
   wherein the user reaction time comprises an action time for entering an application associated with the received notification through the received notification and a check time for a user to identify the received notification, and
   wherein determining the display order of the received notification based on the identified log information comprises:
      determining whether there is another notification;
      in response to determining there is the another notification, identifying an action time of the another notification;
      comparing the action time of the received notification with the action time of the another notification; and
      determining the display order of the received notification based on a comparison result.

10. The method of claim 9, wherein the log information further comprises at least one of position information, interaction information or application information.

11. The method of claim 9, wherein determining the display order of the received notification based on the comparison result comprises:
   in response to determining that the action time of the received notification is ahead of the action time of the another notification, determining the display order of the received notification to be above the display order of the another notification.

12. The method of claim 9, wherein determining the display order of the received notification based on the comparison result comprises:
   in response to determining that the compared action times are the same, determining the display order of the received notification of a faster check time to be above the display order of the another notification of a slower check time.

13. The electronic device of claim 1, wherein the processor is configured to:
   in response to determining that the compared action times are the same, determine the display order of the received notification of a faster check time to be above the display order of the another notification of a slower check time.

14. The electronic device of claim 5, wherein the display information comprises at least one of an amount, a structure, a size, a color, an image or a shape of information provided when the received notification is provided.

15. The electronic device of claim 7, wherein the processor is configured to determine whether the received notification exceeds the display, and
   in response to determining that the received notification exceeds the display, determine the display order of the received notification to a preset position.

16. The electronic device of claim 8, wherein the processor is configured to:
   in response to determining that the indicator is selected while the first user interface is displayed, switch to the second user interface.

\* \* \* \* \*